United States Patent [19]

Leland

[11] 4,370,448
[45] Jan. 25, 1983

[54] THERMOSETTING COMPOSITION COMBINED HIGH VINYL DIOLEFIN POLYMER WITH HIGH VINYL LOW VINYL DIOLEFIN POLYMER

[75] Inventor: John E. Leland, Bartlesville, Okla.

[73] Assignee: Phillips Petroleum Company, Bartlesville, Okla.

[21] Appl. No.: 247,040

[22] Filed: Mar. 24, 1981

[51] Int. Cl.³ .......................... C08L 9/06; C08L 9/00
[52] U.S. Cl. .................................... 525/99; 525/914; 525/236; 525/237
[58] Field of Search .............................. 525/99, 914

[56] References Cited

U.S. PATENT DOCUMENTS

| | | | |
|---|---|---|---|
| 3,244,773 | 4/1966 | Crouch | 525/236 |
| 3,245,929 | 4/1966 | Railsback et al. | 260/23.7 |
| 3,400,091 | 9/1968 | Stumpe | 260/23.7 |
| 3,636,141 | 1/1972 | O'Neill et al. | 525/227 |
| 3,678,134 | 7/1972 | Middlebrook | 525/99 |
| 3,681,474 | 8/1972 | Lombardi et al. | 525/914 |
| 3,766,124 | 10/1973 | Tompkins | 260/33.6 AQ |
| 3,840,493 | 10/1974 | Marrs et al. | 260/42.47 |
| 3,928,270 | 12/1975 | South, Jr. | 260/23.7 M |
| 3,950,292 | 4/1976 | Cooper | 260/23.7 R |
| 3,978,165 | 8/1976 | Stumpe, Jr. et al. | 156/128 T |
| 3,989,769 | 11/1976 | Bonnington | 525/914 |
| 4,107,236 | 8/1978 | Naylor et al. | 526/337 |
| 4,158,654 | 6/1979 | Moczygemba et al. | 260/40 R |
| 4,255,296 | 3/1981 | Ogawa et al. | 525/99 |
| 4,324,866 | 4/1982 | Furuichi et al. | 525/914 |

*Primary Examiner*—Wilbert J. Briggs, Sr.

[57] ABSTRACT

A thermosetting composition in which high vinyl diolefin polymer chosen from among homopolymers of 1,3-butadiene and copolymers of 1,3-butadiene with styrene are admixed with about 15 to about 35 weight percent of the total polymer phase of a normally solid, elastomeric 1,3-butadiene homopolymer having high vinyl and low vinyl segments in a weight ratio of about 60:40 to about 40:60. Preferably the thermosetting composition also contains from about 15 to about 35 weight percent of the total polymeric phase of a normally solid rubbery polymer of isobutylene. A method for improving the impact strength of cured polymeric compositions in which high vinyl diolefin polymers selected from homopolymers of 1,3-butadiene and copolymers of 1,3-butadiene and styrene are admixed with about 15 to about 35 weight percent of the total polymer phase of a normally solid, elastomeric 1,3-butadiene homopolymer having high vinyl and low vinyl segments in a weight ratio of about 60:40 to about 40:60, and a curing agent, and then subjecting the composition to curing conditions. Preferably the method the composition also has admixed therein from about 15 to about 35 weight percent of the total polymeric phase of a normally solid rubbery polymer of isobutylene. The cured composition produced by the method above.

9 Claims, No Drawings

4,370,448

THERMOSETTING COMPOSITION COMBINED HIGH VINYL DIOLEFIN POLYMER WITH HIGH VINYL LOW VINYL DIOLEFIN POLYMER

BACKGROUND OF THE INVENTION

This invention relates to thermosetting compositions. In one of its aspects this invention relates to thermosetting compositions based on a mixture of high vinyl diolefin polymers. In another of its aspects, this invention relates to the improvement of physical properties of thermosetting compositions based on a mixture of high vinyl diolefin polymers. In yet another of its aspects, this invention relates to improving the impact strength of thermosetting compositions without loss of other mechanical properties.

Thermosetting compositions based on high vinyl polybutadiene usually exhibit low impact strength. Although the addition of rubbery polymers should help to absorb energy when impacted such an addition also reduces the mechanical properties of such compositions because the rubbery polymers do not cross-link into the matrix.

Improvement of impact strength without loss of other mechanical properties in thermosetting compositions based on high vinyl polybutadiene has, therefore, become of some importance. It has now been discovered that by using a polymer containing styrene-butadiene-high vinyl butadiene, either as the thermoset resin or with another thermoset resin in a typical thermoset composition that such an improvement can be obtained. It has been theorized that in such a composition the cold flow properties and ease of processing are retained by the polystyrene blocks (segments), the impact improved by the polybutadiene blocks (segments), and the mechanical properties retained because the vinyl groups can cross-link into the matrix.

Up until this time thermosetting compositions containing high vinyl-polybutadiene, polyisobutylene, and polybutadiene have been considered as having a good overall balance of physical properties which are an improvement over composition containing high vinyl butadiene-styrene alone or in combination with polyisobutylene. The compositions proposed in the present invention exhibit a superior balance of physical properties to the compositions of the prior art containing cis-polybutadiene and also provide an alternative method for improving the physical properties of high vinyl butadiene-styrene based compositions.

It is, therefore, an object of this invention to provide a thermosetting composition that upon curing exhibits a good balance of physical properties. It is another object of this invention to provide a method for improving the physical properties of thermosetting compositions based on high vinyl butadiene-styrene polymer.

Other aspects, objects and various advantages of this invention will become apparent upon reading this specification and the appended claims.

STATEMENT OF THE INVENTION

According to this invention there is provided a thermosetting composition that contains (a) high vinyl diolefin polymer chosen from among homopolymers of 1,3-butadiene and copolymers of 1,3-butadiene and styrene and (b) normally solid elastomeric 1,3-butadiene polymers consisting of high vinyl and low vinyl segments. Preferably there is also present a normally solid rubbery polymer of isobutylene.

In another embodiment of the invention there was provided a method for improving the impact strength of cured polymeric compositions based on high vinyl diolefin polymer. According to this method there is mixed with the high vinyl diolefin polymer a normally solid elastomeric 1,3-butadiene homopolymer consisting of high vinyl and low vinyl segments, and the curing agent. The composition is then subjected to conditions suitable for curing the composition. Preferably, in addition to the normally solid elastomeric 1,3-butadiene homopolymer there is also admixed into the thermosetting composition a normally solid rubbery polymer of isobutylene.

The high vinyl diolefin polymers referred to above include the homopolymers of 1,3-butadiene and the copolymers of 1,3-butadiene and styrene. The configuration of the copolymers can be random or block in nature, or combinations, although block copolymers particularly radial block (teleblock) copolymers, are presently preferred. The copolymers are normally solid, having a weight average molecular weight ranging from about 10,000 to about 400,000 or higher, preferably from 50,000 to 250,000.

The configuration of the butadiene block of the copolymers can range from about 50 to about 90 weight percent 1,2-addition. The balance of the configuration, 10–50 weight percent is generally a mixture of 1,4-cis and 1,4-trans, e.g., 10 percent trans and 40 percent cis, 5 percent trans and 5 percent cis, etc., and depends on the polymerization system employed.

The polymerized conjugated diene content of the copolymers ranges from about 50 to about 95 weight percent and preferably from about 75 to about 90 weight percent. The balance of 5–50 weight percent constitutes polymerized styrene. The copolymers are thermoplastic and can be classified as thermoplastic elastomers. The copolymers utilized in this invention can be produced by any of the known polymerization processes, preferably one yielding the presently desired radial block structure and desired microstructure of the repeating units of the butadiene block. For example, the copolymer can be prepared in a hydrocarbon solution by polymerizing styrene with an alkali metal initiator such as n-butyllithium to form a polystyrene block, then butadiene is added and polymerized in the presence of a vinyl promoter such as tetrahydrofuran to form a polybutadiene block and the resulting block copolymer terminated with a lithium atom is coupled with one or more other such copolymers by employing a polyfunctional coupling agent, e.g., silicon tetrachloride, epoxidized linseed oil, etc. High vinyl butadiene-styrene block copolymers are disclosed in U.S. Pat. No. 3,766,124. Radial block butadiene-styrene copolymers in which low vinyl and high vinyl blocks are employed are disclosed in U.S. Pat. No. 4,107,236. These polymers can comprise from about 45 to about 80 weight percent of the polymeric phase of the compositions and preferably from 50 to about 60 weight percent. In the final composition, the polymeric phase can range from about 20 to about 30 weight percent, the balance comprising fillers, mold release agents, coupling agents, organic peroxide, and the like, chiefly fillers with a suitable quantity of an organic peroxide.

Impact improvement of the compositions is achieved by incorporating in the polymeric phase from about 15 to about 35 weight percent (based on the polymeric phase) of a normally solid elastomeric 1,3-butadiene polymer, preferably homopolymer consisting of one or more blocks of both a high vinyl segment and a low vinyl segment. The weight ratio of the two segments (blocks) can vary from about 60:40 to about 40:60 with about 50:50 presently preferred. The configuration of the high vinyl segment can range from about 50 to about 90% to 1,2-addition, preferably from about 60 to about 80 percent. The configuration of the low vinyl segment can vary from about 5 to about 15 percent 1,2-addition and preferably from 7 to 12 percent. The molecular weight of the conjugated diene homopolymer can range from about 20,000 to about 200,000, or higher, and preferably from about 50,000 to about 100,000. It can be prepared by employing the process described in U.S. Pat. No. 4,107,236 previously cited.

Shrinkage control of the composition is achieved, at least in part by admixing from about 15 to about 35 weight percent (based on the polymeric phase) of a normally solid rubbery component selected from among polymers of isobutylene such as polyisobutylene and butyl rubber, e.g., 98/2 mole percent isobutylene/isoprene.

The shrinkage control agent and impact improvement agent together, however, constitute from about 20 to about 50 weight percent of the polymeric phase of the composition. Preferably, the weight ratio of impact control agent to shrinkage control agent ranges from about 0.5:1 to about 1.5:1.

Fillers employed in the compositions of this invention are selected from among alumina, clay, calcium carbonate, metal silicates such as Wollastonite, mica, feldspar, talc, silica, glass fiber and the like, and mixtures. In general, the amount of filler employed will be in the range of from about 40 to about 500 parts by weight per 100 parts by weight polymeric phase.

In most cases a silane coupling agent is employed to promote the adhesion of the filler to the polymeric phase. Examples of silanes which can be used include: tris(2-methoxyethoxy) vinyl silane, vinyltriethoxy silane, gamma-methacryloxypropyltrimethoxy silane, beta-(3,4-epoxycyclohexyl)-ethyltrimethoxy silane, gamma-glycidoxypropyltrimethoxy silane, N-beta-(aminoethyl)-gamma-aminopropyltrimethoxy silane, gamma-mercaptopropyltrimethoxy silane, vinyltriacetoxy silane, gamma-aminopropyltriethoxy silane, and the like, and mixtures thereof. A presently preferred coupling agent is gamma-methacryloxypropyltrimethoxy silane.

The thermosetting molding compositions of the invention include an organic peroxide compound as a curing agent for the conjugated diene polymer. Suitable organic peroxy compounds include the dihydrocarbyl peroxides, the peroxy esters, and the peroxy ketals, preferably containing up to about 30 carbon atoms per molecule. Exemplary organic peroxy compounds include t-butyl peroxybenzoate, di-t-butyl peroxide; dicumyl peroxide; 1-butylperoxy isopropyl carbonate; n-butyl-4,4-bis(t-butylperoxy) valerate; alpha, alpha'bis(t-butylperoxy)diisopropylbenzene; 2,5-dimethyl-2,5-bis(t-butylperoxy)hexane; 2,5-dimethyl-2,5-bis(t-butylperoxy)-3-hexyne; 2,5-dimethyl-2,5-dihydroperoxyhexane; and admixture thereof. A presently preferred organic peroxide is 2,5-dimethyl-2,5-bis(t-butylperoxy)-3-hexyne.

The amount of the silane employed will depend upon the quantity and particle size of the metal silicate filler, the greater the surface area of the filler the greater the amount of the silane employed. In general the silane will be present in an amount in the range of about 0.1 to about 10 parts by weight per 100 parts by weight of the polymer, and preferably in the range of about 0.5 to about 5 parts by weight per 100 parts by weight of the polymer. The organic peroxide curing agent will generally be employed in an amount in the range of about 1 to about 12 parts by weight per 100 parts by weight of the polymer, and preferably in the range of about 2 to about 8 parts by weight per 100 parts by weight of the polymer.

The thermosetting molding composition of the invention can include processing aids, examples of which include the metal carboxylates such as calcium and zinc stearates, naturally occurring and synthetic waxes such as beeswax, ceresin, Fischer-Tropsch wax, microcrystalline wax, polyethylene wax; amides such as erucamide, oleamide, stearamide, ethylene bis(stearamide) and the like, and admixtures thereof. These processing aids are employed to reduce the apparent viscosity of the molding composition and will generally be present, when employed, in an amount in the range of about 1 to about 8 parts by weight per 100 parts by weight of the polymer, preferably in the range of about 2 to about 4 parts by weight per 100 parts by weight of the polymer. Other additives such as antioxidants, pigments, antistatic agents, plasticizing agents and the like can also be employed in the thermosetting molding composition.

The components of the thermosetting molding composition should be uniformly mixed prior to molding. This can be done in any manner known in the art. For example, the blend ingredients can be mixed in a Plastograph such as manufactured by the C. W. Brabender Company, and then further homogenized on a roll mill. In both the Plastograph and roll mill operation, elevated temperatures may be employed. However, the temperature employed should be below the activation temperature for the peroxide curing agent to avoid premature curing of the blend. A Banbury mixer or other types of mixing devices can also be employed to mix the ingredients of the thermosetting composition.

The thermosetting compositions of the invention can be molded and cured at elevated temperatures, for example, from about 150° to about 200° C. for a period of time in the range of about 5 minutes to about 1 hour.

The following example is presented in further illustration of the invention and should not be construed in undue limitation thereof.

EXAMPLE

A series of compositions was prepared by employing a Brabender Plastograph at 120° C., 50 rpm, and a 5 minute mixing period. Each compound sample was removed from the mixer, sheeted off on a cooled two roll mill, and compression molded at 190° C. for 5 minutes at about 550 psi (3.8 MPa) platen pressure into slabs measuring $5 \times 5 \times \frac{1}{8}$ inches ($12.7 \times 12.7 \times 0.317$ cm). The mixing procedure consisted of charging the base high vinyl styrene-butadiene radial teleblock copolymer and polymeric impact modifiers therefor to the Brabender, then for convenience, a premixed blend of filler and liquids, e.g., organic peroxide, coupling agent, etc., and finally the remaining solid ingredients.

A description of each component used follows:

1. High vinyl styrene-butadiene (B/S) radial teleblock copolymer weight average molecular weight of 128,000, number average molecular weight of 115,000, 19.5 weight percent polymerized styrene, 80.5 weight percent polymerized butadiene, 70 percent 1,2-configuration, 11.7 percent trans-1,4 configuration and 17.5 percent cis-1,4 configuration.

2. High vinyl-low vinyl polybutadiene of weight average molecular weight of 94,000. Total 1,2 configuration of 42 percent, total cis-1,4 configuration of 24 percent and total trans-1,4 configuration of 34 percent. The high vinyl segment constituting 50 weight percent of the polymer is 75 percent in the 1,2 configuration. The remaining 50 weight percent of the polymer, the low vinyl portion, is 9 percent in the 1,2 configuration.

3. Polyisobutylene, commercially available polymer of a nominal weight average molecular weight of 90,000 sold by the Exxon Corporation, Houston, Tex.

4. Cis-4, 1203, cis-polybutadiene sold by Phillips Petroleum Company, Bartlesville, Okla., nominal weight average molecular weight of 326,000, nominal number average molecular weight of 136,000, nominal configuration of 92 percent cis-1,4, 3 percent trans-1,4 and 5 percent 1,2.

5. Wollastonite P-4, calcium silicate of 3 micron average particle size sold by Interpace Corporation, Willsboro, N.Y.

6. Organic peroxide, Lupersol 130, 2,5-dimethyl-2,5-di(ti-butyl-peroxy)-hexyne-3 sold by Lucidol Division of Pennwalt Corporation, Buffalo, N.Y.

7. Coupling agent gamma-methacryloxypropyltrimethoxy silane sold by Union Carbide Corporation, New York, N.Y.

8. Mold release agent, zinc stearate.

9. Crosslinkable, plasticizing agent, Saret 515, trimethacrylate of trimethylol propane sold by Sartomer Company, West Chester, Pa.

The compositions employed expressed in parts by weight and the results obtained are given in the Table.

percent cis-4,1203 in its composition, the invention run shows markedly superior flexural modulus, flexural strength, and tensile break values while impact strength in both runs is about the same. Similarly, invention runs 4,4a containing 30 weight percent HV-LV, BD in their compositions can be compared with control runs 1, 1a, 1b containing 30 weight percent cis-4,1203 in their compositions. It is again apparent that the invention runs exhibit significantly increased flexural modulus, flexural strength, and tensile break values over the controls while impact strength remains about the same.

Some of the runs are made in different time periods resulting in the duplicates shown. For a strictly comparative standpoint, runs 1,2,3 and 4a are made in the same time period and runs 1b and 4 are run in another time period while run 1a is made in still another time period. Thus, while some scatter is noted for the results obtained in different time periods, the general trend showing superiority of invention compositions over control composition in the values specified before in a given time period is readily apparent.

I claim:

1. A thermosetting composition comprising:
   (a) High vinyl diolefin polymer chosen from among the group consisting of (1) homopolymers of 1,3-butadiene having about 50 to about 90 percent 1,2 addition and (2) copolymers of about 50 to about 95 weight percent 1,3-butadiene having about 50 to about 90 percent 1,2 addition and about 50 to about 5 weight percent styrene and
   (b) About 15 to about 35 weight percent of total polymer phase of a normally solid elastomeric 1,3-butadiene polymer consisting of segments of high vinyl having about 50 to about 90 percent 1,2 addition and low vinyl having about 5 to about 15 percent 1,2 addition in a weight ratio of high vinyl:low vinyl of

TABLE

Effect of High Vinyl-Low Vinyl Polybutadiene (HV-LV,BD) On Physical Properties

| Run Number | 1 | 1a | 1b | 2 | 3 | 4 | 4a |
|---|---|---|---|---|---|---|---|
| B/S Copolymer | 50 | 50 | 50 | 50 | 50 | 50 | 50 |
| HV-LV, BD | 0 | 0 | 0 | 0 | 20 | 30 | 30 |
| Cis-4, 1203 | 30 | 30 | 30 | 20 | 0 | 0 | 0 |
| Polyisobutylene | 20 | 20 | 20 | 30 | 30 | 20 | 20 |
| Wollastonite | 300 | 300 | 300 | 300 | 300 | 300 | 300 |
| Lupersol 130 | 4 | 4 | 4 | 4 | 4 | 4 | 4 |
| Zinc Stearate | 2 | 2 | 2 | 2 | 2 | 2 | 2 |
| Silane Coupling Agent | 2 | 2 | 2 | 2 | 2 | 2 | 2 |
| Saret 515 | 5 | 5 | 5 | 5 | 5 | 5 | 5 |
| Remarks | Control | Control | Control | Control | Invention | Invention | Invention |
| Flexural Modulus, MPa | 2600 | 2800 | 2910 | 2490 | 4830 | 6100 | 5700 |
| Flexural Strength, MPa | 27.5 | 30.4 | 31.3 | 23.9 | 31.6 | 43.2 | 39.1 |
| Tensile Break, MPa | 19.7 | 21.5 | 21.8 | 17.9 | 21.9 | 31.7 | 30.4 |
| Elongation, % | 7 | 5 | 4 | 5 | 5 | 2 | 5 |
| Notches Izod Impact J/m | 30.4 | 15.7 | 27.8 | 21.4 | 21.9 | 28.3 | 30.4 |

The results in invention runs 3,4,4a show that substitution of a polybutadiene having a weight average molecular weight of about 94,000 and with the previously described high vinyl block-low vinyl block substituted for the previously described high cis-1,4 configuration poly-butadiene used in control runs 1, 1a, 1b, 2 results in compositions exhibiting generally substantially increased values for flexural modulus, flexural strength and tensile break while impact strength is not impaired and, in fact, can be improved somewhat over the control compositions. For example, comparing invention run 3 containing 20 weight percent HV-LV, BD in its composition with control run 2 containing 20 weight about 60:40 to about 40:60.

2. A thermosetting composition of claim 1 wherein the composition contains from about 15 to about 35 weight percent of the total polymeric phase of a normally solid rubbery polymer of isobutylene, said 1,3-butadiene homopolymer and said polymer of isobutylene together comprising about 20 to about 50 weight percent of the total polymeric phase.

3. A thermosetting composition of claim 1 or 2 in which the composition also comprises at least one additional component chosen from among the group consisting of fillers, coupling agents, curing agents, processing aids, antioxidants, pigments, antistatic agents and plasticizing agents.

4. A thermosetting composition of claim 3 wherein said coupling agent is a silane compound chosen from among tris(2-methoxyethoxy)vinyl silane, vinyltriethoxy silane, gamma-methacryloxypropyltrimethoxy silane, beta-(3,4-epoxycyclohexyl)-ethyltrimethoxy silane, gamma-glycidoxypropyltrimethoxy silane, N-beta-(aminoethyl)-gamma-aminopropyltrimethoxy silane, gamma-mercaptopropyltrimethoxy silane, vinyltriacetoxy silane, gamma-aminopropyltriethoxy silane, and mixtures thereof, and said curing agent is an organic peroxy compound chosen from among dihydrocarbyl peroxide, peroxy esters, and peroxy ketals, preferably containing up to about 30 carbon atoms per molecule.

5. A method for improving the impact strength of cured polymeric compositions comprising high vinyl diolefin polymers selected from among the group consisting of (1) homopolymers of 1,3-butadiene having about 50 to about 90 percent 1,2 addition and (2) copolymers of about 50 to about 95 weight percent 1,3-butadiene having about 50 to about 90 percent 1,2 addition and about 50 to about 5 weight percent styrene, said method comprising admixing therewith about 15 to about 35 weight percent of the total polymer phase of a normally solid elastomeric 1,3-butadiene homopolymer consisting of segments of high vinyl having about 50 to about 90 percent 1,2 addition and low vinyl having about 5 to about 15 percent 1,2 addition in a weight ratio of high vinyl:low vinyl of about 60:40 to about 40:60 and a curing agent and subjecting said composition to curing conditions.

6. A method of claim 5 also comprising admixing into the composition before curing from about 15 to about 35 weight percent of the total polymeric phase of a normal solid rubbery polymer of isobutylene, said 1,3-butadiene homopolymer and said polymer of isobutylene together comprising about 20 to about 50 weight percent of the total polymer phase.

7. A method of claim 5 or 6 wherein there is admixed into the composition before curing at least one additional component chosen from among the group consisting of fillers, coupling agents, curing agents, processing aids, antioxidants, pigments, antistatic agents and plasticizing agents.

8. A method of claim 5 wherein said coupling agent is a silane chosen from among tris(2-methoxyethoxy)vinyl silane, vinyltriethoxy silane, gamma-methacryloxypropyl-trimethoxy silane, beta-(3,4-epoxycyclohexyl)-ethyltrimethoxy silane, gamma glycidoxypropyltrimethoxy silane, N-beta-aminoethyl)-gamma-aminopropyltrimethoxy silane, gamma-mercaptopropyltrimethoxy silane, vinyltriacetoxy silane, gamma-aminopropyltriethoxy silane, and mixtures thereof.

9. A cured composition of claim 3 or claim 4.

* * * * *